US00RE39898E

(19) United States
(12) Reissued Patent
Nally et al.

(10) Patent Number: US RE39,898 E
(45) Date of Reissued Patent: Oct. 30, 2007

(54) APPARATUS, SYSTEMS AND METHODS FOR CONTROLLING GRAPHICS AND VIDEO DATA IN MULTIMEDIA DATA PROCESSING AND DISPLAY SYSTEMS

(75) Inventors: Robert M. Nally, McKinney, TX (US); John C. Schafer, Austin, TX (US)

(73) Assignee: NVIDIA International, Inc., St. Michael (BB)

(21) Appl. No.: 09/374,041

(22) Filed: Aug. 13, 1999

Related U.S. Patent Documents

Reissue of:
(64) Patent No.: 5,598,525
Issued: Jan. 28, 1997
Appl. No.: 08/376,919
Filed: Jan. 23, 1995

(51) Int. Cl.

| | |
|---|---|
| ***G09G 5/397*** | (2006.01) |
| ***G09G 5/36*** | (2006.01) |
| ***G09G 5/39*** | (2006.01) |
| ***G06F 15/80*** | (2006.01) |
| ***G06F 15/76*** | (2006.01) |
| ***G06T 1/20*** | (2006.01) |

(52) U.S. Cl. ..... 345/546; 345/505; 345/548; 345/558; 345/634; 345/519; 345/531; 345/506

(58) Field of Classification Search ..... 345/501–506, 345/519, 520, 531, 535, 545–548, 558, 629, 345/788, 790, 559, 589; 348/510, 714, 717, 348/719, 584

See application file for complete search history.

(56) References Cited

U.S. PATENT DOCUMENTS

| | | | |
|---|---|---|---|
| 3,618,035 A | 11/1971 | Simms et al. | 709/204 |
| 3,673,324 A | 6/1972 | Ito et al. | 348/584 |
| 4,425,581 A | 1/1984 | Schweppe et al. | 348/510 |
| 4,498,098 A | 2/1985 | Stell | 348/510 |

(Continued)

OTHER PUBLICATIONS

Shandle, Jack, "Windows Accelerator Chip Provides Multimedia Port", Electronic Design, Jun. 24, 1993, pp. 45, 46, 48–50.

"Spitfire 64–bit Multimedia GUI Accelerator—Preliminary Specification", Oak Technology, Sep. 1994.

Article entitled "Industry's first Video Cache DAC", publication unavailable, date unavailable.

Wilson, Ron, "Brooktree finishes video set", Electronic Engineering Times, Feb. 1, 1993, p. 57.

"Chip Designer Brooktree Corp Comes Out with Two Devices to Facilitate Cheap Desktop Video Design", Computergram International; Feb. 12, 1993; p. N/A.

Brooktree Advance Information for 135 MHz Monolithic CMOS Video Cache DAC™, Brooktree Corporation, Oct. 15, 1993, pp. 1–55.

(Continued)

*Primary Examiner*—Kee M. Tung
(74) *Attorney, Agent, or Firm*—Zilka-Kotab, PC

(57) ABSTRACT

A graphics and video controller 105 is provided which includes a dual aperture interface 206 for receiving words of graphics and video pixel data, each word of such data associated with an address directing that word to be processed as either graphics or video data. Circuitry 200, 201, 202, 207, 208 is provided for writing a word of the pixel data received from the interface 206 to a one of the on- and off-screen memory areas corresponding to the address associated with the received word. Circuitry 201, 202 is provided for selectively retrieving graphics and video data from the on-screen and off-screen memory areas. A first pipeline 205 is provided for processing data received from the on-screen area of frame buffer 107 while a second pipeline 204 is provided for processing data retrieved from the off-screen area of the frame buffer.

48 Claims, 4 Drawing Sheets

U.S. PATENT DOCUMENTS

| | | | | |
|---|---|---|---|---|
| 4,599,611 | A | 7/1986 | Bowker et al. | 345/636 |
| 4,719,503 | A | 1/1988 | Craver et al. | 348/717 |
| 4,740,832 | A | 4/1988 | Sprague et al. | 348/717 |
| 4,745,462 | A | 5/1988 | Dischert et al. | 348/717 |
| 4,771,279 | A | 9/1988 | Hannah | 345/559 |
| 4,779,144 | A | 10/1988 | Dischert et al. | 386/31 |
| 4,839,728 | A | 6/1989 | Casey | 348/565 |
| 4,862,269 | A | 8/1989 | Sonoda et al. | 348/514 |
| 4,868,548 | A | 9/1989 | Gelvin | 345/856 |
| 4,876,600 | A | 10/1989 | Pietzsch et al. | 348/588 |
| 4,878,117 | A | 10/1989 | Ikehira et al. | 348/565 |
| 4,914,509 | A | 4/1990 | Idei | 348/566 |
| 4,947,257 | A | 8/1990 | Fernandez et al. | 348/585 |
| 4,991,122 | A | 2/1991 | Sanders | 345/698 |
| 4,994,912 | A | 2/1991 | Lumelsky et al. | 348/441 |
| 4,994,914 | A | 2/1991 | Wiseman et al. | 348/584 |
| 5,001,469 | A | 3/1991 | Pappas et al. | 345/790 |
| 5,003,491 | A | 3/1991 | Heckt | 345/639 |
| 5,027,212 | A | 6/1991 | Marlton et al. | 348/512 |
| 5,065,243 | A | 11/1991 | Katagiri | 348/565 |
| 5,065,346 | A | 11/1991 | Kawai et al. | 348/428 |
| 5,097,257 | A | 3/1992 | Clough et al. | 345/213 |
| 5,208,583 | A | 5/1993 | Cusick et al. | 345/28 |
| 5,218,432 | A | 6/1993 | Wakeland | 348/590 |
| 5,220,312 | A | 6/1993 | Lumelsky et al. | 345/563 |
| 5,225,911 | A | 7/1993 | Buckley et al. | 358/296 |
| 5,229,852 | A | 7/1993 | Maietta et al. | 348/441 |
| 5,229,855 | A | 7/1993 | Siann | 345/588 |
| 5,243,433 | A | 9/1993 | Hailey | 514/638 |
| 5,243,447 | A | 9/1993 | Bodenkamp et al. | 345/629 |
| 5,245,322 | A | 9/1993 | Dinwiddie et al. | 345/629 |
| 5,245,702 | A | 9/1993 | McIntyre et al. | 345/541 |
| 5,251,298 | A | 10/1993 | Nally | 345/568 |
| 5,257,348 | A | 10/1993 | Roskowski et al. | 345/546 |
| 5,258,750 | A | 11/1993 | Malcolm et al. | 345/634 |
| 5,274,753 | A | 12/1993 | Roskowski et al. | 345/546 |
| 5,291,188 | A | 3/1994 | McIntyre et al. | 345/543 |
| 5,294,983 | A | 3/1994 | Ersoz et al. | 348/521 |
| 5,319,388 | A | 6/1994 | Mattison et al. | 345/558 |
| 5,319,447 | A | 6/1994 | Garino et al. | 348/708 |
| 5,327,243 | A | 7/1994 | Maietta et al. | 348/565 |
| 5,335,321 | A | 8/1994 | Harney et al. | 345/503 |
| 5,341,318 | A | 8/1994 | Balkanski et al. | 708/402 |
| 5,341,442 | A * | 8/1994 | Barrett | 382/166 |
| 5,345,252 | A | 9/1994 | Hannah | 345/162 |
| 5,351,087 | A | 9/1994 | Christopher et al. | 348/441 |
| 5,365,278 | A | 11/1994 | Willis | 353/31 |
| 5,381,347 | A * | 1/1995 | Gery | 345/548 |
| 5,396,263 | A | 3/1995 | Seiler et al. | 345/503 |
| 5,402,147 | A | 3/1995 | Chen et al. | 345/546 |
| 5,402,506 | A | 3/1995 | Schafer | 382/270 |
| 5,402,513 | A | 3/1995 | Schafer | 382/298 |
| 5,406,306 | A | 4/1995 | Siann et al. | 345/546 |
| 5,410,547 | A | 4/1995 | Drain | 714/732 |
| 5,420,643 | A | 5/1995 | Romesburg et al. | 348/581 |
| 5,426,731 | A | 6/1995 | Masukane et al. | 345/501 |
| 5,430,486 | A | 7/1995 | Fraser et al. | 348/426.1 |
| 5,432,905 | A | 7/1995 | Hsieh et al. | 345/99 |
| 5,434,590 | A | 7/1995 | Dinwiddie et al. | 345/634 |
| 5,434,676 | A | 7/1995 | Okamoto et al. | 386/95 |
| 5,440,683 | A | 8/1995 | Nally et al. | 345/558 |
| 5,455,626 | A | 10/1995 | Xu et al. | 348/385.1 |
| 5,455,628 | A | 10/1995 | Bishop | 348/446 |
| 5,469,221 | A | 11/1995 | Takeuchi | 348/564 |
| 5,473,573 | A | 12/1995 | Rao | 365/230.01 |
| 5,488,390 | A | 1/1996 | Reinert et al. | 345/856 |
| 5,502,837 | A | 3/1996 | Hoffert | 713/400 |
| 5,506,604 | A | 4/1996 | Nally et al. | 345/603 |
| 5,510,843 | A | 4/1996 | Keene et al. | 348/446 |
| 5,537,128 | A | 7/1996 | Keene et al. | 345/89 |
| 5,539,464 | A | 7/1996 | Xu et al. | 348/388.1 |
| 5,539,465 | A | 7/1996 | Xu et al. | 348/388.1 |
| 5,542,038 | A | 7/1996 | Schafer | 345/671 |
| 5,543,842 | A | 8/1996 | Xu et al. | 348/386.1 |
| 5,546,531 | A | 8/1996 | Lippincott | 345/547 |
| 5,553,220 | A | 9/1996 | Keene | 345/520 |
| 5,557,302 | A | 9/1996 | Levinthal et al. | 345/506 |
| 5,559,954 | A | 9/1996 | Sakoda et al. | 345/546 |
| 5,577,203 | A | 11/1996 | Reinert et al. | 345/558 |
| 5,581,279 | A | 12/1996 | Chang et al. | 345/519 |
| 5,581,280 | A | 12/1996 | Reinert et al. | 345/558 |
| 5,586,306 | A | 12/1996 | Romano et al. | 711/112 |
| 5,608,864 | A | 3/1997 | Bindlish et al. | 345/558 |
| 5,625,379 | A | 4/1997 | Reinert et al. | 345/604 |
| 5,640,332 | A | 6/1997 | Baker et al. | 345/559 |
| 5,646,651 | A | 7/1997 | Spannaus et al. | 345/519 |
| 5,701,270 | A | 12/1997 | Rao | 365/230.03 |
| 5,752,010 | A | 5/1998 | Herbert | 345/546 |
| 5,821,918 | A | 10/1998 | Reinert et al. | 345/643 |

OTHER PUBLICATIONS

Harney, Kevin et al., "82750DB Programming Guide", Intel Corporation, Jan. 7, 1991, pp. 1–63.

"Multimedia and Supercomputing Processors", Intel Corporation, 1991.

"Sony Picks Parallax Video Boards", Computergram International, ATI020575.

Mirabella, Rich et al., "Sony, Parallax Graphics Agreement Brings Full–Motion Video to Unix Workstations", ATI020577–020578.

"VIPER Video Image Processor Data Book", Tseng Labs, ATI002393–002487.

"Parallax 1280 Reference Manual", Parallax Graphics, ATI32068–32766.

"Parallax Graphics VIPER Reference Manual", Parallax Graphics, ATI031566–32067.

Pico, Marty , "Coprocessors Provide Integrated Video and Graphics", ATI018935–18936.

Gosling et al., "The News Book by Sun Microsystems, Inc.", ATI027719–37.

"Serpents in Paradise", UNIX Review, 110 vol. 7, No. 9, ATI019425–26.

1280 Circuit Schematics, ATI018984–97.

Viper Circuit Schematics, ATI0118970–83.

Harney, Kevin et al., "The i750® Video Processor: A Total Multimedia Solution", Digital Multimedia Systems, Communications of the ACM, Apr. 1991, vol. 34, No. 4, pp. 65–78.

"OTI–107 Data Book," version 1.0, Oak Technology, Inc. Apr. 6, 1993. ATI17515–520 (Apr. 1993 Data Book.).

"SPITFIRE—64–bit Multimedia GUI Accelerator–OTI–64107 Preliminary Specification," Oak Technology, Jan. 14, 1994, ATI18036–018197 (Jan. 1994 Spec.).

"Intel–ATI in Race Against VESA Bus," Electronic Engineering Times, ATI026182–026183.

"Intel's i750® Video Processor—The Programmable Solution," Manepally, et al. Intel Princeton Operation ATI 057155–057160.

"Tseng Labs Video Image Processor (VIPER)—Pre–release Information," Tseng Labs, ATI017499–017502.

ET4000/W32 Graphics Accelerator Data Book, Tseng Labs, ATI002488–ATI002744.

"Tseng LabsET4000/W32I Graphics Accelerator," May 12, 1993, ATI017493–498.

"CL–PX2085 Preliminary Data Book," dated Oct. 1993, Pixel Semiconductor, ATI011566–011628.

"CL–PX2080 Media DAC Preliminary Data Sheet," Nov. 1992, ATI023971–024065.
"PxVPS Programmer's Reference Manual," Oct. 1993, Pixel Semiconductor, CL049172–049363.
"User Interface," Guide (ATI020390–94).
"110 MHz Monolithic CMOS Video CahceDAC™", Product Overview ATI019895–019958.
"110 MHz Monolithic CMOS Video CacheDAC™", Product Overview ATI019959–020014.
"135 MHz Monolithic CMOS Video CacheDAC™", Product Overview ATI020015–020068.
"82750PD Video Processor Programmer's Reference Manual", Intel , Sep. 1993.
"Expert Report of William G. Mears".
"CL–PX2070: Preliminary Data Book", Jul. 1993, ATI019027–ATI019142.
"CL–PX2080: MediaDAC™", May 29, 1992, ATI020370–ATI020373.
"CL–PX2080: Preliminary Product Bulletin", Aug. 1992, ATI020381–ATI020384.
Steve Undy "A Low–Cost Graphics & Multimedia Workstation Chip Set" IEEE Micro. Apr. 1994, pp. 10–82.*
Bill Snyder "The Cirrus Scar" PC Week, Oct. 1994, v11, n42, pA1 (3).*
James Turley "Brooktire reveals Multimedia Plans;" Microprocessor Reprot. Dec. 1994, v8, n16, p. 19 (1).*
Dave Bursky "Acceleration puts the 'snap' into graphics" Electronic Design, Jul. 1994, v42, n15, p55(7).*
Anthony Cataldo "WD, Cirrus Show Video Playback ICs" Electronic News, Oct. 1994, v40, n2035, p66(1).*
Edge: Work—Group Computing Report, Oct. 1994, v5, n228 p15(1), Edge Publishing.*
Jeff Mace "Mainstream graphics accelerators rush power" PC Magazine, Dec. 1994, v13, n21, p239 (17).*

* cited by examiner

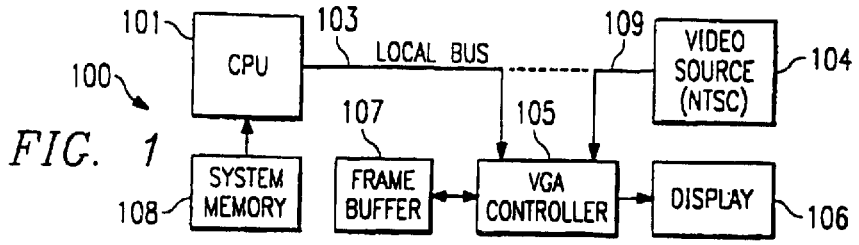
FIG. 1
FIG. 4A
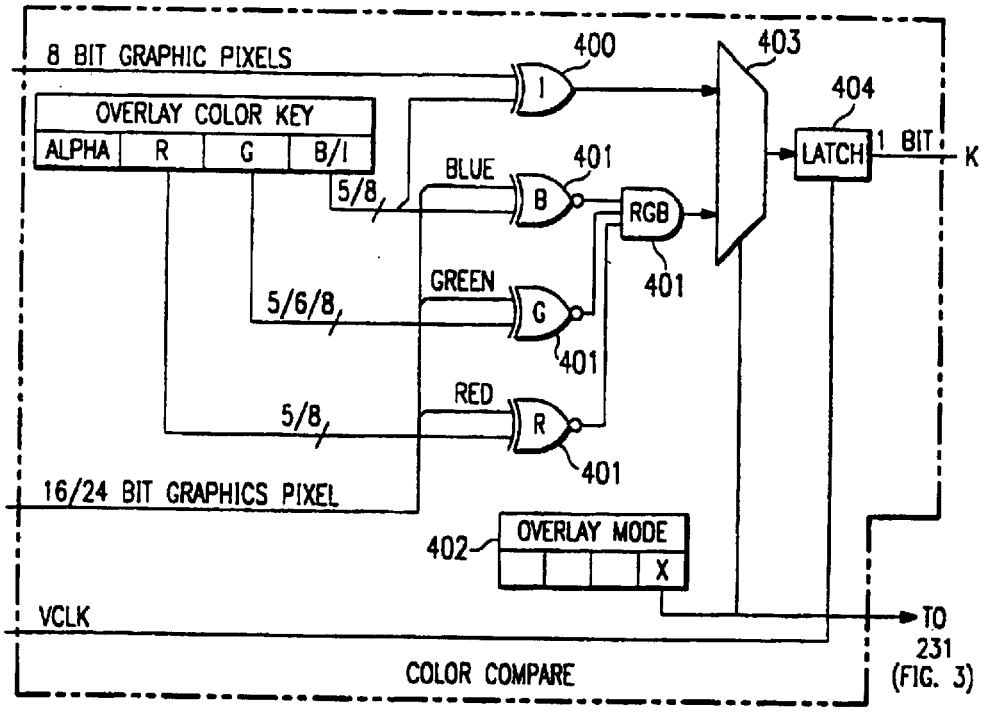
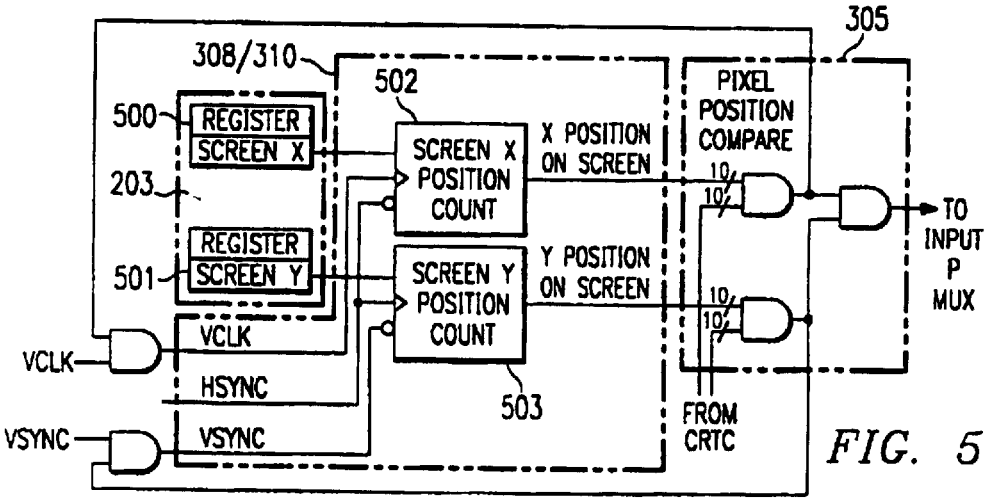
FIG. 5

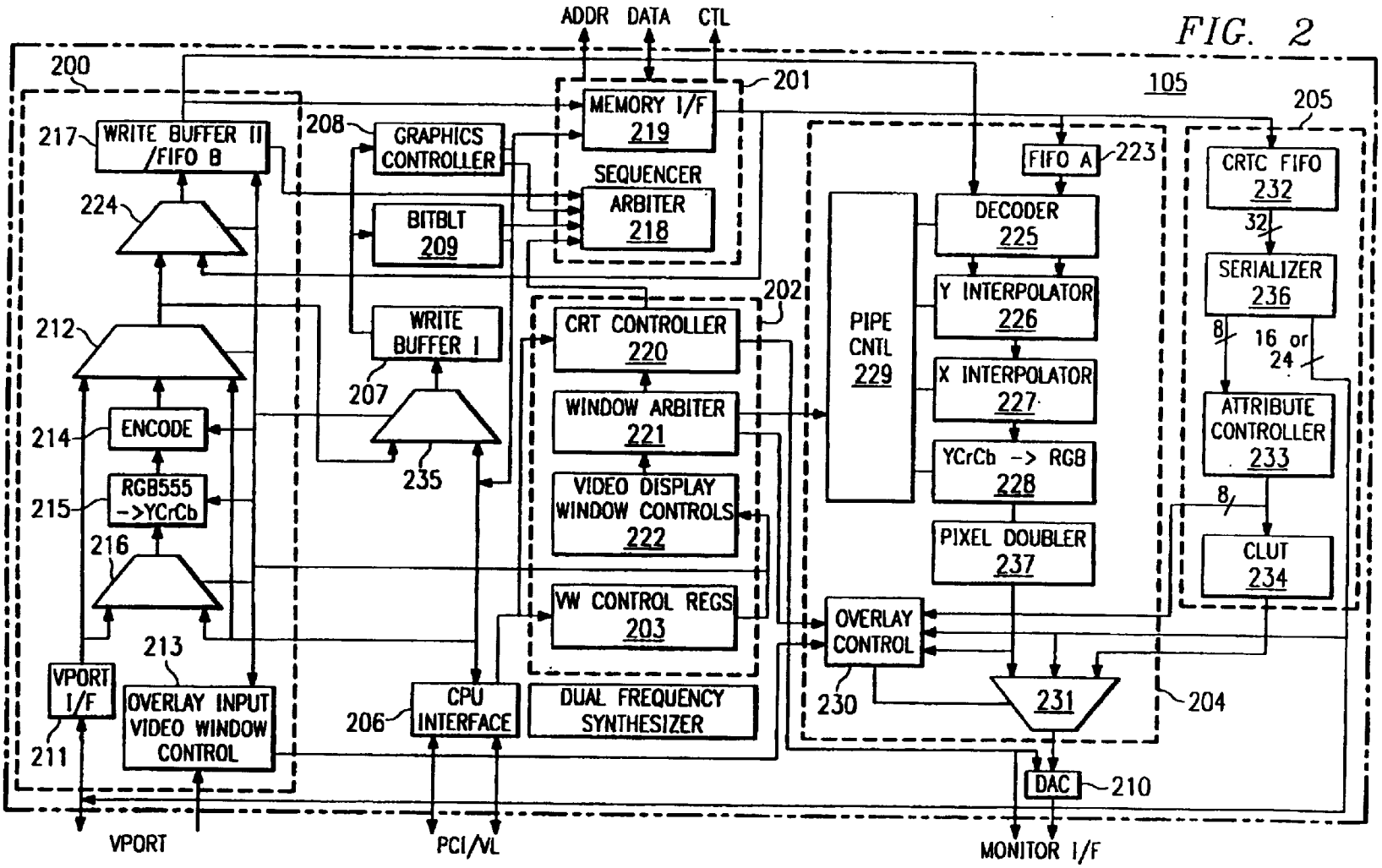
FIG. 2
105
205
CRTC FIFO 232
32
SERIALIZER 236
16 or 24
8
ATTRIBUTE CONTROLLER 233
8
CLUT 234
204
223
FIFO A
DECODER 225
Y INTERPOLATOR 226
X INTERPOLATOR 227
YCrCb -> RGB 228
PIXEL DOUBLER 237
231
DAC
210
MONITOR I/F
PIPE CNTL 229
OVERLAY CONTROL
230
201
202
ADDR DATA CTL
MEMORY I/F 219
SEQUENCER
ARBITER 218
CRT CONTROLLER 220
WINDOW ARBITER 221
VIDEO DISPLAY WINDOW CONTROLS 222
VW CONTROL REGS 203
DUAL FREQUENCY SYNTHESIZER
GRAPHICS CONTROLLER
BITBLT 209
WRITE BUFFER I
207
235
CPU INTERFACE
206
PCI/VL
208
WRITE BUFFER II /FIFO B
217
224
212
ENCODE
214
RGB555 ->YCrCb
215
216
213
OVERLAY INPUT VIDEO WINDOW CONTROL
VPORT I/F
211
VPORT
200

APPARATUS, SYSTEMS AND METHODS FOR CONTROLLING GRAPHICS AND VIDEO DATA IN MULTIMEDIA DATA PROCESSING AND DISPLAY SYSTEMS

Matter enclosed in heavy brackets [ ] appears in the original patent but forms no part of this reissue specification; matter printed in italics indicates the additions made by reissue.

REEXAMINATION RESULTS

*The questions raised in reexamination request No. 90/005,471, filed Aug. 13, 1999, have been considered and the results thereof are reflected in this reissue patent which constitutes the reexamination certificate required by 35 U.S.C. 307 as provided in 37 CFR 1.570(e).*

TECHNICAL FIELD OF THE INVENTION

The present invention relates in general to multimedia processing and display systems and in particular to apparatus, systems and methods for controlling graphics and video data overlay in multimedia processing and display systems.

CROSS-REFERENCE TO RELATED APPLICATIONS

The following copending and coassigned United States patent application contain related information and are incorporated herein by reference:

U.S. patent application Ser. No. 08/098,846 (Attorney's Docket No. P3510-P11US), entitled "System And Method For The Mixing Of Graphics And Video Signals," and filed Jul. 29, 1993; and U.S. patent application Ser. No. 08/223,845 *now U.S. Pat. No. 5,506,604* (Attorney's Docket No. P3510-P21US), entitled "Apparatus, Systems And Methods For Processing Video Data In Conjunction With A Multi-Format Frame Buffer," and filed Apr. 6, 1994.

BACKGROUND OF THE INVENTION

As multimedia information processing systems increase in popularity, system designers must consider new techniques for controlling the processing and display of data simultaneously generated by multiple sources. In particular, there has been substantial demand for processing systems which have the capability of concurrently displaying both video and graphics data on a single display screen. The development of such systems presents a number of design challenges, not only because the format differences between graphics and video data must be accounted for, but also because of end user driven requirements that these systems allow for flexible manipulation of the data on the display screen.

One particular technique for simultaneously displaying video and graphics data on a single display screen involves the generation of "windows." In this case, a stream of data from a selected source is used to generate a display within a particular region or "window" of the display screen to the exclusion of any non-selected data streams defining a display or part of a display corresponding to the same region of the screen. The selected data stream generating the display window "overlays" or "occludes" the data from the nonselected data streams which lie "behind" the displayed data. In one instance, the overall content and appearance of the display screen is defined by graphics data and one or more "video windows" generated by data from a video source occlude a corresponding region of that graphics data. In other instances, a video display or window may be occluded or overlaid by graphics data or even another video window.

In the multimedia environment, the "windowing" described above yields substantial advantages. Among other things, the user can typically change the size and location on the display screen of a given window to flexibly manipulate the content and appearance of the data being displayed. For example, in the case of combined graphics and video, the user can advantageously create custom composite visual displays by combining multiple video and graphics data streams in windowing environment.

In order to efficiently control windows in a multimedia environment efficient frame buffer management is required. Specifically, a frame buffer control scheme must be developed which allows for the efficient storage and retrieval of multiple types of data, such as video data and graphics data. To be cost competitive as well as functionally efficient, such a scheme should minimize the number of memory devices and the amount of control circuitry required and should insure that data flow to the display is subjected to minimal delay notwithstanding data type.

One of the major difficulties in managing video in a combined video and graphics windowing environment results from the fact that the video data being received and displayed are constantly being updated, typically at a rate of thirty frames per second. In contrast, the graphics data are normally generated once to define the graphics display and then remain static until the system CPU change that graphics display. Thus, the occlusion (overlay) of video data with graphics data requires that the static graphics data "in front of" the video data not be destroyed each time the video window is updated. A second concern with windowing systems operating on both video and graphics data is the formatting differences between the video and graphics data themselves since video is typically digitized into a YUV color space while graphics is digitized into an RGB color space. Hence, any combination video and graphics windowing system must have the capability of efficiently handling data within both the YUV and RGB formats.

Thus, due to the advantages of windowing, the need has arisen for efficient and cost effective windowing control circuitry. Such windowing circuitry should allow for the simultaneous processing of data received from multiple sources and in multiple formats. In particular, such windowing control circuitry should be capable of efficiently and inexpensive controlling the occlusion and/or overlay of video and graphics data in a windowing environment.

SUMMARY OF THE INVENTION

The principles of the present invention is general provide for the flexible control of graphics and video data in a display control environment. In particular, an entire frame of video data, graphics data, or a combination of both, may be stored in on-screen memory and rastered out with the generation of the corresponding display screen. A window of graphics or video data can then be stored in off-screen memory and retrieved when the raster scan generating the display reaches the desired position on the display for the video window. The window of data from off-screen memory can then be overlayed over the data being rastered out of the on-screen memory under one of three conditions. In a first mode, pixels from the off-screen memory are rastered only when the raster scan has reached the position on the display selected for the window. In a second mode, a window of data is rastered from the off-screen memory when the display raster scan has reached the display window position and graphics data being rastered from the on-screen memory matches a color key. In a third mode, the window data is rastered out of the off-screen memory when the data being output from the on-screen memory matches the color key, notwithstanding the position of the raster scan.

According to a first embodiment of the present invention, a graphics and video controller is provided which includes a dual aperture interface, each word associated with an address to a selected one of on-screen and off-screen areas of an associated unified frame buffer as either graphics or video pixel data. Circuitry is provided for writing a word of the pixel data received by the interface to a one of the on-screen and off-screen memory areas corresponding to the address associated with the received word. Circuitry is also included for selectively retrieving graphics and video data from the on-screen and off-screen memory areas. A first pipeline is provided for processing graphics data retrieved from the frame buffer and a second pipeline is provided for video processing data retrieved from the frame buffer.

According to a second embodiment of the present invention, a controller is provided which includes a dual aperture port for receiving video and graphics data, each word of the data received with an address associated directing the word to be processed as either graphics or video data and off-screen memory spaces of a frame buffer. A second port is included for receiving real-time video data. Circuitry is provided for generating an address associated with a selected one of the memory spaces for each word of received real-time video data. Circuitry is included for writing selectively the words into the on-screen and off-screen memory spaces of the frame buffer. Circuitry is also provided for selectively retrieving the words of data from the on-screen and off-screen spaces as data is rastered for driving a display. A graphics backend pipeline processes ones of the graphics words of data retrieved from the frame buffer. A video backend pipeline is provided for processing ones of the video words of data retrieved from the frame buffer, the circuitry for retrieving always rastering a stream of graphics data from the frame buffer to the graphics pipeline and rastering video data to the video backend pipeline when a display raster scan reaches a display position of a video window. An output selector is included for selecting for output between words of data output from the graphics backend pipeline and words of data output from the video backend pipeline.

According to a third embodiment of the present invention, a display system is provided which includes first and second parallel backend pipelines. A multi-format frame buffer memory is included having on-screen and off-screen memories each operable to simultaneously store data in graphics and video formats. A dual aperture port is provided for receiving both graphics and video data as directed by an address associated with each word of data received. Circuitry for writing is included for writing a word of video or graphics data into a selected one of the on-screen and off-screen areas of the multi-frame buffer. Memory control circuitry controls the transfer of data between the first and second backend pipelines and the frame buffer. The system further includes a display unit and overlay control circuitry for selecting for output to the display unit between data provided by the first backend pipeline and data provided by the second backend pipeline.

A fourth embodiment of the present invention comprises a display data processing system which includes circuitry for writing data into an on-screen space of a frame buffer and circuitry for writing data into an off-screen space of the frame buffer. A video pipeline is provided for processing video data output from a selected one of the on-screen and off-screen spaces. The video pipeline includes a first first-in/first-out memory for receiving selected pixel data from the selected space. The video pipeline also includes a second first-in/first-out memory disposed in parallel to the first first-in/first-out memory for receiving other selected data from the selected space in the frame buffer. An interpolator is provided as part of the video pipeline for generating additional data by interpolating data output from the first and second first-in/first-out memories. A graphics pipeline is disposed in parallel to the video pipeline for processing graphics data output from a selected one of the on-screen and off-screen spaces. Finally, an output selector is provided for selecting between data output from the video pipeline and data output from the graphics pipeline.

The principles of the present invention allow for the construction of circuits and systems with substantial advantages over the prior art. Among other things, the principles of the present invention allow both graphics and video data to be stored in a single unified frame buffer and retrieved therefrom in a number of different ways. For example, a combination of graphics and video data may be stored in the on-screen memory and simply rastered out during screen refresh. In another case, an entire screen of graphics or video data may be stored in the on-screen memory while a window of graphics or video data is stored in the off-screen portion of memory. The window data can then be rastered out to selectively overlay a portion of the data being rastered out of the on-screen memory. The overlay may be controlled by either window display position with a match of the on-screen data being rastered out and a color key, or both.

The embodiments of the present invention provide for the efficient and inexpensive overlay of video and graphics data in a windowing environment. In particular, the use of color comparison to determine the overlay of data in a window region eliminates the need for precise x- and y-position data for the location of that window and allows for video cropping to be performed. Further, the use of graphics data to control overlay provides substantial advantages in that graphics data is less subject to the graininess and noise problems often found with video data. Further, the user is given total control of overlay operations when keying on graphics data because the graphics data is computer generated, whereas the video data is captured data.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a top level functional block diagram of a multi-media processing and display system embodying the principles of the present invention;

FIG. 2 is a more detailed functional block diagram of the VGA controller depicted in FIG. 1;

FIG. 4A is a detailed functional block diagram of a first embodiment of the color comparison circuitry of FIG. 3;

FIG. 5 is a detailed functional block diagram of a selected one of the video window position control circuits depicted in FIG. 3.

DESCRIPTION OF THE INVENTION

Figure 3:
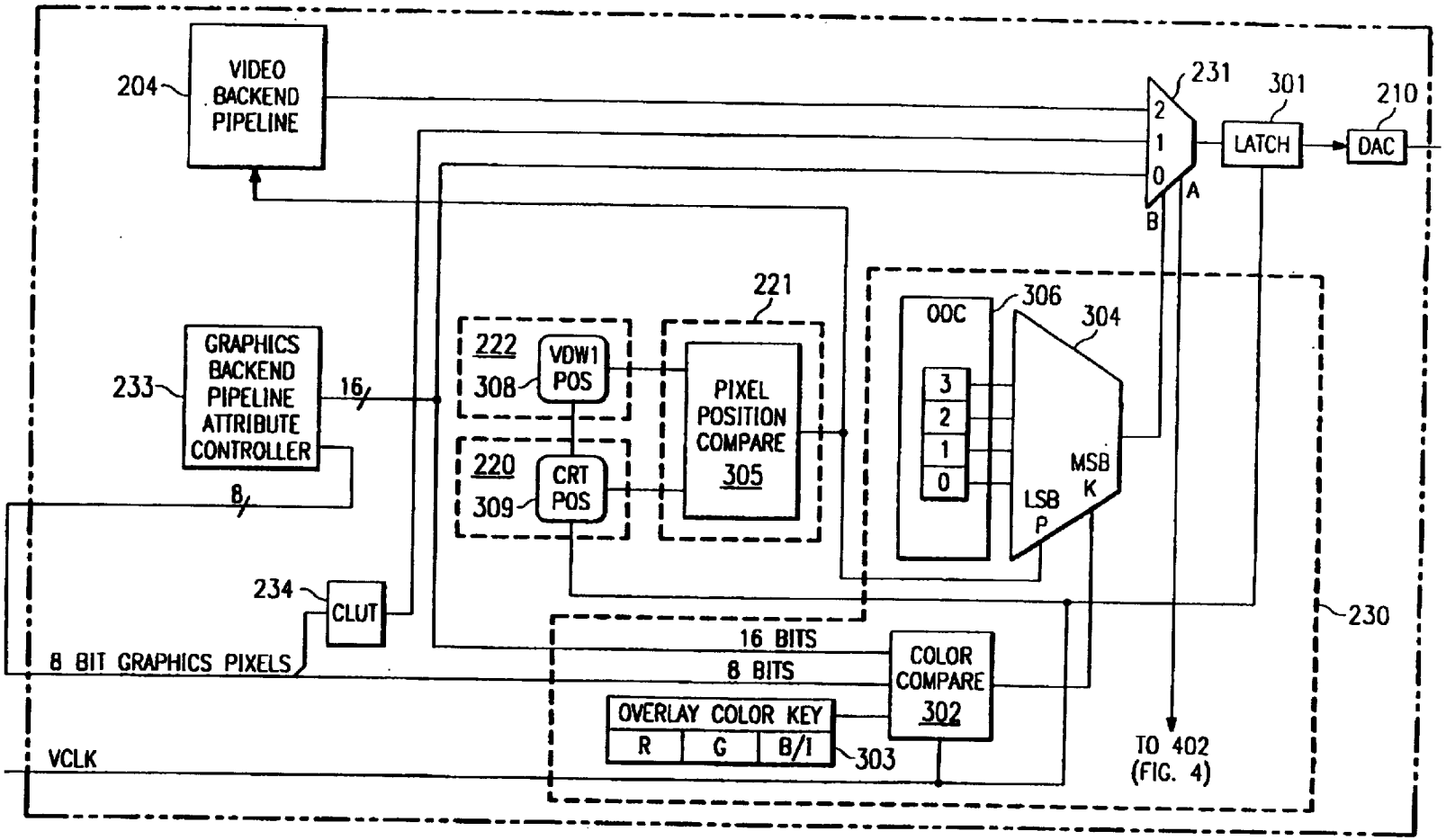
FIG. 3 is an expanded functional block diagram of portions of the controller of FIG. 2 with emphasis on the overlay control features.

FIG. 1 is a high level functional block diagram of a multi-media processing and display system 100 operable to process and simultaneously display on a single display screen both graphics and video data according to the principles of the present invention. Display system 100 includes a central processing unit (CPU) 101 which controls the overall operation of system 100 and generates graphics data defining graphics images to be displayed. CPU 101 communicates with the remainder of the system discussed below via a local bus 103. System 100 also includes a real-time video data source 104. A real time video stream may be presented to the system VGA controller 105 in one of two ways. First, video data source 104 may be coupled to local bus 103 and a video data stream introduced through dual aperture addresses. In this case, video source 104 will directly address the system frame buffer 107. Second, video source 104 may be coupled directly to VGA controller 105 via a dedicated bus 109 or "video port." In this instance, VGA controller 105 generates the required addresses into frame buffer 107. Real-time video source 104 may be, for example, a CD ROM unit, a laser disk unit, a videotape unit, television cable outlet or other video data source outputting video data in a YUV format. CPU 101 operates in conjunction with a system memory 108 which stores graphics and video data on a real-time basis. System memory 108 may be for example random access memory (RAM), floppy disk, hard disk or other type of storage device.

A VGA controller 105 embodying the principles of the present invention is also coupled to local bus 103. VGA controller 105 will be discussed in detail below; however, VGA controller 105 generally interfaces CPU 101 and video source 104 with a display unit 106 and a multiformat system frame buffer 107. Frame buffer memory 107 provides temporary storage of the graphics and video data during processing prior to display on display unit 106. According to the principles of the present invention, VGA controller is operable in selected modes to store graphics and video data together in frame buffer 107 in their native formats. In a preferred embodiment, the frame buffer area is partitioned into on-screen memory and off-screen memory. Frame buffer 107 is also a "unified" memory in which video or graphics data can be stored in either the on-screen or off-screen areas. In the preferred embodiment, display unit 106 is a conventional raster scan display device and frame buffer 107 is constructed from dynamic random access memory devices (DRAMs).

FIG. 2 is a more detailed functional block diagram of VGA controller 105. The primary circuitry blocks of VGA controller 105 include video front-end video pipeline 200, memory (frame buffer) control circuitry 201, CRT/window control circuitry 202, video window control registers 203, video backend pipeline 204 and graphics backend pipeline 205, VGA controller 105 further includes a CPU interface 206 for exchanging instructions and data via a PCI or VL bus, such as local bus 103 in system 100, with CPU 101. A write buffer 207 and conventional graphics controller 208 allow CPU 101 to directly control data within frame buffer 107 via memory control circuitry 201.

In the preferred embodiment of system 100, CPU 101 can write video data and/or read and write graphics data to frame buffer 107 via CPU interface 206. In particular, CPU 101 can direct each pixel to the frame buffer using one of two maps depending on whether that pixel is a video pixel or a graphics pixel. In the preferred embodiment, each word of pixel data ("pixel") is associated with one of two addresses, one which directs interpolation of the pixel as a video pixel through video front-end pipeline 200 and the other which directs interpolation of the pixel as a graphics pixel through write buffer 207 and graphics controller 208. As a consequence, either video or graphics pixel data can then be input to CPU interface 206 from the PCI/VI bus through a single "dual aperture" port as a function of the selected address *held in an address buffer*.

Data which is input through the video port 211 is address-free. In this case, video window controls 213 generates the required addresses to either the on-screen memory area or the off-screen memory as a function of display location for the video window. In the preferred embodiment, window controls 213 generate addresses using the same video control registers 203 used to control retrieval of the video in the backend pipeline (i.e., the screen x and y position registers 500 and 501 discussed below in conjunction with FIG. 5). When data is being received through both the CPU interface 206 and the VPORT 211 simultaneously, the data is interleaved into memory with the two write buffers 207 and 217 buffering the data such that neither stream is interrupted or forced into a wait state at the source component (i.e., bus 103 or video source 104).

It should be noted at this point that frame buffer 107 includes at least two different data areas or spaces to which data can be directed by the given address (either CPU 103 or controls 213 generated.) Each space can simultaneously store graphics or video data depending on the selected display configuration. The on-screen area corresponds to the display screen; each pixel rastered out of a given pixel location in the on-screen area defines a corresponding screen pixel. The off-screen area is used to store data defining a window for selectively overlaying the data from the on-screen memory, fonts and other data necessary by controller 105. Further, as will be discussed below, both graphics and video data may be rastered from frame buffer 107 and passed through video backend pipeline 104 while only graphics data is ever passed through graphics backend pipeline 205.

According to the principles of the present invention, there are alternate ways of storing and retrieving graphics and video data from unified frame buffer 107.

For example, CPU 103 may write a static graphics background into part of the on-screen memory with the remaining "window" in the on-screen memory area filled with playback video data. "Playback" video data can be either (1) live video data input from the VPORT; (2) YUV (video) data written through interface 206 by CPU 103; or (3) true color (5:5:5, 5:6:5, or 8:8:8) RGB graphics data (for example animation graphics data) written in through either the VPORT or interface 206. Similarly, a playback video background and a window of graphics data may be written into the on-screen area. In each of these cases, the data is rastered out as the display is without overlay; the video playback data is passed through the video backend pipeline 204 as a function of display position by controls 202 and the graphics data passed through the graphics backend pipeline 250.

Windows of data retrieved from the off-screen memory can be retrieved and used to occlude a portion of the data being rastered out of the on-screen memory. For example, a window of playback data can be stored in the off-screen memory and a frame of static graphics data (either true color data or indices to CLUT 234) stored in the on-screen memory. In this case, the static graphics are rastered out of the on-screen memory without interruption and passed through the graphics backend pipeline 205. The window of data in the off-screen memory is rastered out only when the display position for the window has been reached by the display raster and is passed through video backend pipeline 204. As discussed below, data from the video backend pipeline 204 can then be used to selectively occlude (overlay) the data being output from the graphics backend pipeline 205. A window of static graphics data (true color or indices to the CLUT 234) can be stored in off-screen memory and used to overlay playback video from the on-screen memory. The playback video data is passed through the video backend pipeline 204 and the window of static graphics data is passed through the graphics backend pipeline 205.

Bit block transfer (BitBLT) circuitry 209 is provided to allows blocks of graphics data within frame buffer 107 to be transferred, such as when a window of graphics data is moved on the display screen by a mouse. Digital-to-analog converter (DAC) circuitry 210 provides the requisite analog signals for driving display 106 in response to the receipt of either video data from video backend pipeline 204 or graphics data from backend pipeline 208.

In implementing the operations discussed above, video front-end pipeline 200 can receive data from two mutually exclusive input paths. First, in the "playback mode," playback (non-real time) data may be received via the PCI bus through CPU interface 206. Second, in the "overlay emulation mode" either real-time or playback video may be received through the video port interface 211 (in system 100 video port interface 211 is coupled to bus 109 when real-time data is being received). The selection of video from the PCI bus or video from video port interface 211 is controlled by a multiplexer 212 under the control of bits stored in a video front-end pipeline control register within video control registers 203. In the playback mode, either CPU 101 or a PCI bus master controlling the PCI bus provides the frame buffer addresses allowing video front-end pipeline 200 to map data into the frame buffer separate and apart from the graphics data. In the overlay emulation mode, overlay input window controls 213 receives framing signals such as VSYNC and HSYNC, tracks there sync signals with counters to determine the start of each new frame and each new line, generates the required addresses for the real-time video to the frame buffer space using video window position data received from window controls 222 (as discussed above, in the preferred embodiment, video data is always retrieved from either the on-screen on off-screen memory and passed through video back-end pipeline 204 as a function of display position) and thus the position data from controls 222 is used to both write data to memory and retrieve data therefrom. In general, overlay input video control windows are controlled by the same registers which control the backend video pipeline 204, although the requisite counters and comparators are located internal to overlay input video control circuitry 213.

Video front-end pipeline 200 also includes encoding circuitry 214 that is operable to truncate 16-bit YUV 422 data into a 8-bit format and then pack four such 8-bit encoded words into a single 32-bit word which is then written into the video frame buffer space of frame buffer 105. Conversion circuitry 215 is operable to convert RGB 555 data received from either the CPU interface 206 and the PCI bus or VPORT I/F 211 into VCrCb (YUV) data prior to encoding by encoding circuitry 214. Conversion circuitry 215 allows graphics data (for example in a 5:5:5 or 5:6:5 format) to be introduced through the VPORT or graphics data to be converted, packed and stored in a YUV format in the off-screen memory space by CPU 101. For a more complete description of encoder 214 and the associated decoder 225 of video pipeline 204, reference is now made to incorporated copending coassigned application Ser. No. 08/223,845. The selection and control of the encoding circuitry 214 and conversion circuitry 215 is implemented through multiplexing circuitries 212 and 216, each of which are controlled by bits in the video control registers. Finally, video front-end pipeline 200 includes a write buffer/FIFO 217 which in one embodiment acts as a write buffer and in an alternate embodiment acts as a FIFO for the video backend pipeline 204. In embodiments where buffer 217 acts as a write buffer for then Y, zooming on the backend, as discussed below is by replication. In embodiments where buffer 217 operates as a FIFO, then the VPORT and front and end color conversion by converter circuitry 215 are not used for writing data to frame buffer 107.

Memory control circuitry 201 includes an arbiter 218 and a memory interface 219. Arbiter 218 prioritizes and sequences requests for access to frame buffer 107 received from video front-end pipeline 200, graphics controller 208 and bit block transfer circuitry 209. Arbiter 218 further sequences each of these requests with the refresh of the display screen of display 106 under the control of CRT controller 202. Memory interface 219 controls the exchange of addresses, data, and control signals (such as RAS, CAS and read/write enable) to and from frame buffer 107.

CRT control/video window control circuitry 202 includes the CRT controller 220, window arbiter 221, and video display window controls 222. CRT controller 202 controls the refresh of the screen of display 106 and in particular the rastering of data from frame buffer 107 to display unit 107 through DAC 210. In the preferred embodiment, CRT controller 220, through arbiter 218 and memory interface 219, maintains a constant stream of graphics data into graphics backend pipeline 205 from memory; video or playback graphics data is rastered out only when a window has been reached by the display raster as determined by display position controls of window controls 222 (see FIGS. 3 and 5 and accompanying text) and CRT controller 220. As will be discussed in further detail below, the display of windows within the display according to the principles of the present invention is controlled in part by circuitry 202.

Video backend pipeline 204 receives a window of graphics video data defining a display window from the on-screen or off-screen spaces in frame buffer 107 through a pair of first-in/first-out memories 223 and 217 (in embodiments where buffer 217 is acting as FIFO B). In the preferred embodiment, each FIFO receives the data for every other display line of data being generated for display on the display screen. For example, for a pair of adjacent lines n−1 and n+1 in memory (although not necessarily adjacent on the display) for the display window, FIFO 223 receives the data defining window display line n−1 while FIFO 224 receives the data defining window display line n+1. When buffer 217 is used as FIFO B, writes through video front end pipeline 200 are made through write buffer I 207 and multiplexer 235. Alternatively, if buffer 217 is used as write buffer II, then FIFO B is not implemented and only a single stream is processed by video backend pipeline 204 (no Y interpolation is performed and Y expansion is by replication). As will be discussed further below (assuming both FIFO A and FIFO B are being used), one or more display lines, which falls between line n−1 and line n+1, may be selectively generated by interpolation. Decoder circuitry 225 receives two 32-bit packed words (as encoded by encoder 214), one from each adjacent scan line in memory, from FIFOs 223 and 217. Each 32-bit word, which represents four YCrCb pixels, is expanded and error diffused by decoder 225 into four 16-bit YCrCb pixels. In modes where video data is stored in the frame buffer in standard 555 RGB or 16 YCrCb data formats, decoder block 225 is bypassed.

Backend video pipeline 204 further includes a Y interpolator 226 and X interpolator 227. In the preferred embodiment, during Y zooming (expansion) Y interpolator 226 accepts two vertically adjacent 16-bit RGB or YCrCb pixels from the decoder 225 and calculates one or more resampled output pixels using a four subpixel granularity. X interpolator 227 during X zooming (expansion) accepts horizontally adjacent pixels from the Y interpolator 226 and calculates one or more resampled output pixels using a four subpixel granularity. For data expansion using line replication, Y interpolator 226 is bypassed. Y interpolator 226 and X interpolator 227 allow for the resizing of a video display window being generated from one to four times.

The output of X interpolator 227 is passed to a color converter 228 which converts the YCrCb data into RGB data for delivery to output multiplexer 304. To reiterate, if graphics data is passed through the video pipeline, converter 228 is not used.

Backend video circuitry 204 further includes pipeline control circuitry 229, overlay control circuitry 230 and output multiplexer 231. Pipeline control circuitry 239 controls the reading of data from video FIFOs 223 and 217, controls the generation of interpolation coefficients for use by X and Y interpolators 226 and 227 to resize the video window being pipelined, and times the transfer of data through the pipeline. Overlay control circuitry 230 along with control circuitry 202, controls the output of data through output multiplexer 231, including the overlay of the video window over the graphics data output through the graphics backend pipeline 205. A pixel doubler is provided to double the number of pixels being generated such that a 1280×1024 display can be driven.

Graphics backend pipeline 205 includes a first-in/first-out memory 232, attribute controller 233, and color look-up table 234. Each 32-bit word output from graphics FIFO 232 is serialized into either 8-bit, 16-bit or 24-bit words. The 8-bit words, typically composed of an ASCII code and an attribute code, are sent to attribute controller 233. When 16-bit and 24-bit words, which are typically color data, are serialized, those words are sent directly to overlay controls 230. Attribute controller 233 performs such tasks as blinking and underlining operations in text modes. The eight bits output from attribute controller 233 are pseudo-color pixels used to index CLUT 234. CLUT 234 preferably outputs 24-bit words of pixel data to output multiplexer 231 with each index. When video data is being pipelined through graphics backend pipeline 205 from the on-screen memory, CLUT 234 is bypassed.

The eight bit pseudo-color pixels output from attribute controller 233 are also sent to overlay controls 230. In the preferred embodiment, data is continuously pipelined from on-screen memory through graphics backend pipeline 205 to the inputs of output multiplexer 231. Window data from off-screen memory however is only retrieved from memory and pipelined through video backend pipeline 204 when a window is being displayed. In other words, when a window has been reached, as determined by control bits set by CPU 101 in VW control registers 222, video window display controls 222 generate addresses to retrieve the corresponding data from the off-screen memory space of frame buffer 107. Preferably, video FIFOs 223 and 224 are filled before the raster scan actually reaches the display window such that the initial pixel data is available immediately once the window has been reached. In order to insure that graphics memory data continues to be provided to graphics backend pipeline 205, video window display controls 222 "steal" page cycles between page accesses to the graphics memory. It should be noted that once the window has been reached the frequency of cycles used to retrieve window data increases over the number used to fill the video FIFOs when outside a window. When the frequency of window page accesses increases, video window display controls 222/arbiter 221 preferably "steal" cycles from page cycles being used to write data into the frame buffer.

FIG. 3 is a more detailed functional block diagram emphasizing the circuitry controlling the overlay of data from graphics pipeline 205 with window data from video pipeline 204. As discussed briefly above, the inputs to output multiplexer 231 are data from video backend pipeline 204 (pixel doubler 237), 16 or 24-bit color data directly from graphics backend pipeline 205 serializer 236 and 24-bit color data from the color look-up table 234. The output of data to DAC 210 through output multiplexer 231 is controlled by a latch 301 clocked by the video clock (VCLK). The remaining circuitry shown in FIG. 3, which will be discussed in further detail below, provide the necessary control signals to the control inputs of output multiplexer 231 to select between the video and graphics pipelines.

The graphics pseudo-pixels output from attribute controller 233 and the 16-bit or 24-bit graphics or video data output directly from serializer 236 are provided to the inputs of color comparison circuitry 302. Also input to color comparison circuitry 302 are 16 or 24-bit overlay color key bits stored in overlay color key register 303. Overlay color key register 303 resides within the address space of, and is loaded by, CPU 101. Depending on the mode, color comparison circuitry 302 compares selected bits from the overlay color key register 303 with either the 8 bits indexing look-up table 234 in the color look-up table mode (pseudo-color mode) or the 16-bits (24-bits in the alternate embodiment) passed directly from serializer 236. It should be noted that in the illustrated embodiment, overlay color key register 303 holds 24 overlay color key bits, eight each for red, green, and blue index comparisons. The specific overlay color key bits compared with the input graphics data are provided in Table I:

| MODE | OVERLAY COLOR KEY BITS COMPARED | | |
|---|---|---|---|
| CLUT Index | — | — | Blue/Index<7:0> |
| 5:5:5 | Red<4:0> | Green<4:0> | Blue<4:0> |
| 5:6:5 | Red<4:0> | Green<5:0> | Blue<4:0> |
| 8:8:8 | Red<7:0> | Green<7:0> | Blue<7:0> |

As shown in FIG. 4A, a first embodiment of color comparison circuitry 303 performs the comparisons set forth in Table I as a set of XNOR operations in series with an AND operation. FIG. 4A depicts first comparison circuitry 400 for comparing the 8-bits of graphics pixels received in the look-up table mode from attribute controller 233 with the 8-bit blue/index overlay key bits being held in overlay key register 303. Second comparison circuitry 401, performs the required comparisons of Table I for the 16-bit data or 24-bit received from serializer 236, in either a 5:5:5, 5:6:5, or 8:8:8 format. An overlay register 402 includes a bit loaded by CPU 101 which is used by a selector 403, depending on the mode, to select for output, either the result of the comparisons being made by comparison circuitry 400 in the color look-up table mode or the results of the comparisons being made by comparison circuitry 401. In the illustrated embodiment, color comparison circuitry 303 processes data on a pixel-by-pixel basis and is resynchronized with both the graphics backend pipeline 205 and the video backend pipeline 204 by having its outputs latched to the video clock (VCLK) by latches 404.

The output of color comparison circuitry 303 is passed to the "K" control input of overlay control multiplexer 304. The "P" control input to multiplexer 304 is provided from pixel position comparison circuitry 305. The data inputs to multiplexer 304 are coupled to an 8-bit overlay OP Code (OOC) register 306. The output of multiplexer 304 is used as one control input to output multiplexer 304, which along with a single bit set by CPU 101 into output control register 307, selects which of the data received at the data inputs of multiplexer 231 will be output to DAC 210.

Figure 4B:
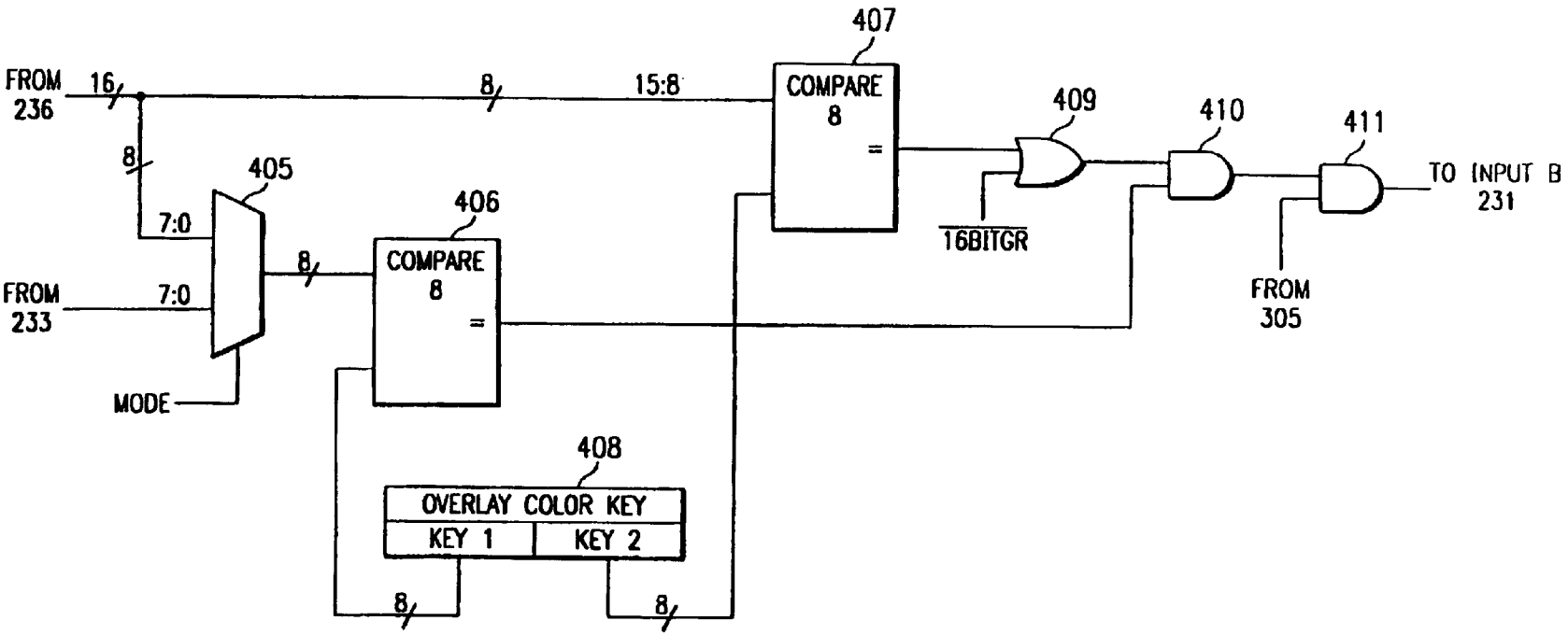
FIG. 4B is a detailed functional block diagram of a second embodiment of the color comparison circuitry of FIG. 3.

Pixel position comparison circuitry 305 includes three inputs coupled respectively to video window 1 position control circuitry 308, CRT position control circuitry 309 and video window 2 position control circuitry 310. In the illustrated embodiment, CRT position controller 309 is located within CRT controller 220 while video window 1 position control circuitry and video window 2 position control circuitry 310 are located within video display window controls 222 (FIG. 2). CRT position control circuitry 309 includes counters which track the position of the current pixel being generated for display. In the preferred embodiment, CRT position control circuitry 309 includes at least an x-position counter which tracks the generation of each pixel along a given display line and a y-position counter which tracks the generation of each display line in a screen. The x-position counter may for example count pixels by counting each VCLK period between horizontal synchronization signal (HSYNC) controlling display unit 106. The y-position counter may for example count each HSYNC signal occurring between each vertical synchronization signal (VSYNC) controlling the screen generation on display unit 106. FIG. 4B is an alternate embodiment of the color comparison circuitry of FIG. 3. In a first mode, 8 bits from attribute controller 233 are passed through multiplexer 405 to comparator 406. Comparator 406 compares the received eight bits with an 8-bit color key in color key register 408; when the received 8-bits equal the 8-bit key 1, the output of comparator 406 goes active (high). In the first mode, control signal $\overline{16BITGR}$ is high (and the output of NOR gate 409 is consequently high) and an active output from comparator 406 is gated through AND gate 410. The output of AND gate 410 is passed to AND gate 411 and gated with the output from the pixel comparison circuitry 305. The output of AND gate 411 goes directly to the "B" control input of selector 231 (in this embodiment multiplexer 304 and register 306 are eliminated). Thus, when the 8-bit graphics pixels output from attribute controller 233 of graphics backend 205 matches the 8-bit color key 1 and the window has been reached as determined by pixel comparison circuitry 305, the pixel data output from video backend 204 are passed through selector 231.

In a second mode, 16 bits are received from serializer 236. The eight LSBs are passed through multiplexer 405 to comparator 406 and the eight MSBs passed to comparator 407. Control signal $\overline{16BITNG}$ is set high. When the LSBs equal key 1 in color register key 408 and the 8 MSBs equal key 2 in color key register 408, the outputs from comparators 406 and 407 are active (high). The output of AND gate 411 then goes high when the output from pixel comparison circuitry 305, which is coupled to the "B" control input of selector 231, goes high. Thus, when the 16-bit pixel data output from serializer 236 of graphics backend 205 matches the 16-bit color key (keys 1 and 2) and a window has been reached, the output pixel data from video backend 204 are passed through selector 231.

FIG. 5 is an expanded functional block diagram of the video window position control circuits 308 and a corresponding portion of the gating of pixel position compare circuitry 305. Each position control circuit 310/312 is coupled to a screen position x-register 500 and a screen position y-register 501, and includes a screen x-position counter 502, and a screen y-position counter 503. In the preferred embodiment, registers 500 and 501 are located within video window control registers 203. For the window corresponding to the given video window control circuitry 308 or 310, registers 500 and 501 are loaded with a value representing the x and y screen position of the pixel in the upper left corner of that window (the starting pixel). Screen x-register 500 and screen y-register 501 in the preferred embodiment are loaded by CPU 101. The screen x-position counter 502 counts down from the value held in screen x-register 500 with each video clock when P is high for each display line and resets with each display horizontal synchronization signal (HSYNC) (Note that when P is high the CRT count matches the position count). Screen y-position counter 503 counts down from the value set into screen y-register 501 for each horizontal sync signal (HSYNC) at the start of each display line and resets with each VSYNC at the start of each new screen (The position counters are allowed to count only when they match their perspective CRT). The counts values in the counters of CRT position control circuitry 309 are compared pixel by pixel with the counts in screen x-position counter 502 and screen y-position 503 of each video window position control circuitry 308 and 310. When both the x and y counts in the counters of CRT position control circuitry 309 match the corresponding x and y counts in respective counters 502 and 503 of either video window control circuitry 308 or 310, the control signal P to multiplexer 304 is activated. The activation of control signal P indicates that the raster scan on display 106 has reached the position of a pixel within the window, and data from video pipeline 205 may be painted depending on the value being held in overlay OP Code (OOC) register 306 and the K control inputs to multiplexer 304.

A 4-bit OP Code loaded by CPU 101 into overlay OP Code register 306 in conjunction with the control signals applied to the "P" and "K" control inputs to multiplexer 304 control the presentation of an active (assumed high in the illustrated embodiment) control signal to the "B" control input to output multiplexer 231. The other ("A") input to output multiplexer 231 receives a bit from overlay mode register 402 (FIG. 4), as loaded by CPU 101. In the illustrated embodiment, the selection between the streams from the graphics and video backends at the 0,1,2 inputs to output multiplexer 304 in response to the signals presented at the corresponding control inputs "A" and "B" is in accordance with Table II:

| Control Input A | Control Input B | Selected Stream |
|---|---|---|
| 0 | 0 | Graphics or video pixels from graphics pipeline 205 |
| 1 | 0 | Graphics pixels from CLUT 234 at input 1 |
| 0 | 1 | Video or graphics from video backend 204 |
| 1 | 1 | |

The OP Codes used in the illustrated embodiment, the effective overlay and the corresponding inputs to the control inputs of multiplexer 304 are listed in Table III (active state is assumed):

| Overlay Op Code Register 309 Value | Multiplexer 307 Control Inputs | Effect |
|---|---|---|
| 0 | N/A | Pixels passed only from graphics pipeline 205 |
| A | Input P active | Paint pixels from video backend pipeline 204 only inside video window VDW.sub.n |
| 8 | Inputs K and P active | Paint from video backend pipeline 204 window VDW.sub.n when color key matches |
| C | Inputs K active | Paint from video backend pipeline 204 if color key matches |

In the illustrated embodiment, if a Oh is written into OOC register 306 by CPU 101, only pixels from graphics pipeline 205 are pipelined through multiplexer 304. In this case any signals applied to the P and K control inputs to multiplexer 304 have no effect (i.e., will not result in a high output from multiplexer 304). In the illustrated embodiment, if an Ah is written into OOC register 306, pixels from video pipeline 204 will be passed to DAC 210 only when pixel position comparison circuitry 305 determines that the raster scan has reached a pixel in the window and hence the control signal going to the P input of multiplexer 304 has been activated. If on the other hand, an 8h is written into OOC register 306, data is passed through output multiplexer 231 to DAC 210 when pixel position comparison circuitry 305 determines that the raster scan has reached a pixel on the display screen within the window and color compare circuitry 302 has determined that the incoming data from graphics pipeline 205 matches the overlay color key held in overlay color key register 303. In this case, the data from video pipeline 204 is passed to DAC 210 when both the P and the K inputs to multiplexer 304 are active. Finally, when an OpCode of C is programmed into OOC register 306, data from video pipeline 204 is passed if the incoming data from graphics pipeline 205 matches the overlay color key held in overlay color key register 303. In this case, the activation of the K control input activate the output of multiplexer 304 to switch the input of multiplexer 231 to pass the corresponding video pixels.

Display control circuits embodying the principles of the present invention have substantial advantages over the prior art. In particular, output control circuits built in accordance with the principles of the present invention allow for the flexible display of both graphics and video on the same screen. In particular, pixel position comparison circuitry 305 along with video window position control circuits 308 and 310 and CRT position control circuitry 309 allow for one or more windows from off-screen memory to be generated in specific areas of a display screen to the exclusion of any simultaneously generated data from on-screen memory. Further, color comparison circuitry 302 operating in conjunction with an overlay color key written into overlay color key register 303 allows window data to be presented on the display screen, to the exclusion of any concurrently generated graphics data, without the need for precise x- and y-position data for the window. Finally, the use of the graphics data from the graphics pipeline 205 to control the output overlay provides additional advantages since the video data can be subject to graininess and noise.

Although the present invention and its advantages have been described in detail, it should be understood that various changes, substitutions and alterations can be made herein without departing from the spirit and scope of the invention as defined by the appended claims.

What is claimed is:

1. A *single integrated* graphics and video controller *adapted for driving a display sequentially* comprising:

an interface for receiving words of pixel data, each said word associated with an address buffer;

circuitry for writing each said word of said pixel data received by said interface to a one of on-screen and off-screen memory areas of a frame buffer;

circuitry for selectively retrieving, *as data is provided for display,* said words from said on-screen and off-screen areas;

a first pipeline for *substantially continuously* processing words of graphics data retrieved from said frame buffer; and a second pipeline for processing words of video data retrieved from said frame buffer *so that the video data is ready for display once a display raster scan reaches a display position of a window.*

2. The controller of claim 1 and further comprising output selection circuitry for selecting for output between graphics data received from said first pipeline and data received from said second pipeline, said selection circuitry operable to:

in a first mode, pass data from said first pipeline; and in a second mode, pass data from said second pipeline when said data corresponds to a selected display position of a display window.

3. The controller of claim 2 wherein said selection circuitry is further operable to:

in a third mode, pass data from said second pipeline when said data corresponds to said selected display position of said display window and data from said first pipeline match a color key.

4. The controller of claim 3 wherein said selection circuitry is further operable in a fourth mode to pass data from said second pipeline when data from said first pipeline match a color key.

5. The controller of claim 1 wherein said circuitry for retrieving maintains a stream of graphics data to said first pipeline and provides video data to said second pipeline when a display raster scan reaches a display position of a window.

6. The controller of claim 1 and further comprising:

a video port for receiving real-time video data; and circuitry for generating an address to said memory at which said real-time video data is to be stored.

7. The controller of claim 1 wherein said second pipeline includes a first first-in-first-out memory for receiving data for a first display line of pixels in memory and a second first-in-first-out memory for receiving data from a second display line of pixels in memory.

8. The controller of claim 7 wherein said first display line is adjacent in memory to said second display line.

9. The controller of claim 7 further comprising output selection circuitry, wherein said output selection circuitry comprises:

an output selector for selecting between data from said second pipeline and data from said first pipeline in response to a selection control signal;

a register for maintaining a plurality of overlay control bits;

window position control circuitry for selectively generating a position control signal when a word of said data stream from said second pipeline falls within a display window;

color comparison circuitry for comparing words of said data stream from said first pipeline with a color key and for providing in response a color comparison control signal; and a control selector for selectively providing said selection control signal in response to said overlay control bits in said register and at least one of said position control and color comparison control signals.

10. The controller of claim 9 wherein said window position control circuitry comprises:

window position counters operable to increment from initial count values corresponding to a starting pixel of a display window as data representing each pixel in a display screen is pipelined through said overlay control circuitry;

screen position counters operable to count as data representing each pixel in said display screen is pipelined through said overlay control circuitry; and comparison circuitry operable to compare a current count in said window position counters and a current count in said screen position counters and selectively generate said position control signal in response.

11. The controller of claim 9 wherein said color comparison circuitry comprises:

a color key register for storing bits composing said color key; and a plurality of AND-gates for comparing said words of said graphics data stream with bits of said color key.

12. The controller of claim 1 wherein said interface includes a dual-aperture port.

13. A *single integrated* controller comprising:

circuitry for writing selectively, *on a word by word basis,* each word of received data into a selected one of on-screen and off-screen memory spaces of a frame buffer;

a first port for receiving video and graphics data, a word of said data received with an address of said memory spaces directing said word to be processed as a word of video data or a word of graphics data;

a second port for receiving real-time video data;

circuitry for generating an address associated with a selected one of said memory spaces for a word of said real-time video data;

circuitry for selectively retrieving said words of data *on a word by word basis* from said on-screen and off-screen memory spaces as data is rastered for driving a display *in a sequential fashion*;

a graphics backend pipeline for processing ones of said words of data representing graphics data retrieved from said frame buffer;

a video backend pipeline, *separate from said graphics backend pipeline,* for processing other ones of said words of data representing video data retrieved from said frame buffer, said circuitry for retrieving always rastering a stream of data from said frame buffer to said graphics backend pipeline and rastering video data to said video backend pipeline [when] *so that the video data is ready for display once* a display raster scan reaches a display position of a window; and output selector circuitry for selecting for output between words of data output from said graphics backend pipeline and words of data output from said video backend pipeline.

14. The controller of claim 13 wherein said output selector circuitry is further operable to select between graphics data output from a color look-up table and true color data output from said graphics pipeline.

15. The controller of claim 13 wherein said output selector circuitry is operable to:

in a first mode, pass only a word of data output from said graphics pipeline;

in a second mode, pass a word of data output from said video pipeline when said display raster scan has reached a display position corresponding to a window and a word of data from said graphics pipeline when said display raster scan is in any other display position;

in a third mode, pass a word of data output from said video pipeline when said display raster scan has reached a display position corresponding to a window and a corresponding word of data from said graphics pipeline matches a color key and a word of data from said graphics pipeline when said display raster scan is in any other display position; and in a fourth mode, pass a word of data from said video pipeline when said corresponding word of data from said graphics pipeline matches a color key and a word of data from said graphics pipeline when said [display raster scan is in any other display position] *corresponding word does not match said color key.*

16. The controller of claim 13 wherein said video pipeline includes a first first-in-first-out memory for receiving a plurality of words of data for a first display line of pixels in memory and a second first-in-first-out memory for receiving a plurality of words of data [from] *for* a second display line of pixels in memory.

17. The controller of claim 16 wherein said first display line is stored adjacent in memory to said second display line.

18. The controller of claim 13 wherein said output selector circuitry comprises:

a control selector having a plurality of control inputs coupled to a register, said register storing a plurality of overlay control bits;

window position control circuitry coupled to a first control input of said control selector, said window position control circuitry operable to selectively provide a first control signal to said first control input when a word of data being pipelined through said video pipeline falls within a display window;

color comparison circuitry operable to compare a word of data being pipelined through said graphics pipeline with a color key and provide in response a second control signal to a second control input of said control selector; and wherein said control selector is operable to provide an output selection control signal in response to at least one of said first and second control signals and said overlay control bits being stored in said register.

19. The circuitry of claim 18 wherein said output selector circuitry further includes a third control input coupled to certain bits of said graphics pipeline, said output selector circuitry further operable to select between data on said respective video and graphics pipelines in response to said certain bits presented to said selector circuitry.

20. The circuitry of claim 18 wherein said window position control circuitry comprises:

a window x-position counter operable to count from a loaded x-position value in response to a video clock, said x-position counter reloading in response to a display horizontal synchronization signal;

a window y-position counter operable to count from a loaded y-position value in response to said horizontal synchronization signal, said y-position counter reloading in response to a display vertical synchronization signal;

CRT position circuitry operable to maintain counts corresponding to a current display pixel; and comparison circuitry operable to compare current counts in said window counters with said current counts held in said CRT position circuitry and generate in response said first control signal.

21. The circuitry of claim 20 wherein said window position control circuitry further comprises an x-position register for holding said x-position value for loading into said x-position counter and a y-position register for holding said y-position value for loading into said y-position counter.

22. The circuitry of claim 13 wherein said color comparison circuitry comprises:

a color key register for storing a plurality of color key bits; and a plurality of XNOR-gates each having at least one input coupled to a bit position in said color key register and at least one input coupled to said graphics data path.

23. The circuitry of claim 13 wherein said video pipeline comprises:

a first-in/first-out memory for receiving a first stream of words of data from said frame buffer;

a second first-in/first-out memory disposed in parallel with said first first-in/first-out memory for receiving a second stream of words of data from said frame buffer; and interpolation circuitry for selectively generating an additional word of data by interpolating a word of said first stream and a word of said second stream data output from said first and second first-in/first-out memories.

24. The controller of claim 13 wherein said first port comprises a dual-aperture port.

25. A display system comprising:

a first backend pipeline for processing data;

a second backend pipeline for processing graphics data disposed in parallel to said first processing pipeline;

a multi-format frame buffer memory having on-screen and off-screen areas each operable to *allow said frame buffer to* simultaneously store data in graphics and video formats;

an input port for receiving both graphics and video data, each word of said data associated with an address directing said word to be processed as either graphics or video data;

circuitry for writing a word of said [playback] *graphics and video* data into a selected one of said areas of said multi-format memory;

memory control circuitry for controlling the transfer of data between said first backend pipeline and said frame buffer and between said second backend pipeline and said frame buffer;

a display unit; and overlay control circuitry for selecting for output to said display unit between data provided by said first backend pipeline and data provided by said second backend pipeline.

26. The display system of claim 25 wherein said second backend pipeline includes:

a first first-in-first-out memory for receiving first selected data;

a second first-in-first-out memory disposed in parallel to said first first-in-first-out memory for receiving second selected data; and interpolation data for generating additional data by interpolating data output from said respective first and second first-in-first-out memories.

27. The display system of claim 26 wherein said second backend pipeline further comprises color conversion circuitry for converting data received from said frame buffer in a video format to a graphics format.

28. The display system of claim 25 further comprising a video front-end pipeline for inputting video data into a selected one of on-screen and off-screen spaces of said frame buffer comprising:

a video data port for receiving video data from a real time data source; and input control circuitry for receiving framing signals associated with said real time data and generating corresponding addresses to said selected one of said spaces in response.

29. The display system of claim 28 wherein said video front-end pipeline further comprises encoding circuitry for packing said video data prior to storage in said selected one of said spaces.

30. The display system of claim 28 wherein said video front-end pipeline further comprises multiplexing circuitry for selecting between video data received through said video data port and data received from a dual aperture port.

31. The display system of claim 28 wherein said video front end pipeline further comprises conversion circuitry for converting graphics data received through said dual-aperture port to a video format for storage in said selected one of said spaces.

32. The display system of claim 25 wherein said first backend pipeline processes playback video.

33. The display system of claim 25 wherein said input port comprises a dual-aperture input port.

34. A *single integrated* display data processing system comprising:

circuitry for writing data into an on-screen space of a frame buffer;

circuitry for writing data into an off-screen space of said frame buffer;

a video pipeline for processing data output from a selected one of said on-screen and off-screen spaces comprising:

a first first-in-first-out memory for receiving selected data from said selected space;

a second first-in-first-out memory disposed in parallel to said first first-in-first-out memory for receiving other selected data from said selected space; and an interpolator for generating additional data by interpolating data output from said respective first and second first-in-first-out memories;

a graphics pipeline disposed in parallel to *and separate from* said video pipeline for processing data output from a selected one of said on-screen and off-screen spaces; and an output selector for selecting between data output from said video pipeline and data output from said graphics pipeline.

35. The system of claim 34 further comprising selection control circuitry for generating an output control signal for controlling said output selector comprising:

a control selector having a plurality of data inputs coupled to a register, said register for storing a plurality of overlay control bits; and color comparison circuitry operable to compare bits of data output from said graphics pipeline with a color key and provide in response a control signal to a control input of said control selector.

36. The system of claim 34 further comprising window position control circuitry operable to provide a second control signal to a second control input of said control selector when data from said video pipeline falls within a display window.

37. A *single integrated* display controller comprising:

circuitry for selectively retrieving data from an associated multi-format frame buffer, *the frame buffer having separate storage locations respectively operable,* for *allowing* simultaneously storing graphics and video data *in said frame buffer*;

a first pipeline for processing words of graphics data selectively retrieved from said frame buffer; and a second pipeline, *separate from the first pipeline,* for processing words of video data selectively retrieved from said frame buffer.

38. The controller of claim 37 wherein said first and second pipelines are disposed in parallel and concurrently process data.

39. The controller of claim 38 further comprising output selection circuitry for selecting for output between graphics data received from said first pipeline and video data received from said second pipeline.

40. The controller of claim 37 wherein said frame buffer is partitioned into on-screen and off-screen areas, each of said on-screen and off-screen areas operable to *allow the buffer to* simultaneously store both graphics and video data.

41. The controller of claim 37 wherein said circuitry for selectively retrieving is operable to retrieve a *substantially* constant stream of graphics data from said frame buffer and provide said stream of graphics data to said first pipeline.

42. The controller of claim 41 wherein said circuitry for selectively retrieving is operable to retrieve at least one said word of video data from said frame buffer and provide said at least one word of said video data to said second pipeline, only when said display controller is generating a video display window.

43. A display controller for interfacing a multi-format frame buffer and a display device, the multi-format frame buffer having on-screen and off-screen areas each *operable* for *allowing* simultaneously storing both graphics and video pixel data *in the frame buffer*, said display controller comprising:

circuitry for selectively retrieving pixel data from a selected one of said on-screen and off-screen areas of said frame buffer;

a graphics backend pipeline for processing graphics data retrieved from said selected one of said areas of said frame buffer;

a video backend pipeline for processing video data retrieved from said selected one of said areas of said frame buffer; and an output selector for selectively passing to said display device data received from said graphics or video backend pipelines.

44. The display controller of claim 43 wherein said circuitry for selectively retrieving is operable to retrieve at least one said word of video data from said frame buffer and provide said at least one said word of video data to said second pipeline only when said display controller is generating a video display window.

45. The display controller of claim 43 wherein said output selector is operable to:

in a first mode pass data from said graphics pipeline; and in a second mode pass data from said video pipeline when a display position corresponding to a video display window has been reached.

46. The display window of claim 43 wherein said output selector is operable to:

in a first mode, pass data from said graphics pipeline; and in a second mode, pass data from said video pipeline when a display position corresponding to a video display window has been reached and data from said graphics pipeline match a color key.

47. The display controller of claim 43 wherein said output selector is operable to:

in a first mode, pass data from said graphics pipeline; and in a second mode, pass data from said video pipeline when data from said graphics pipeline matches a color key.

*48. The controller of claim 42 in which graphics data is substantially continuously retrieved for a display while video data is retrieved only for the video display window.*

* * * * *